(12) United States Patent
Chang

(10) Patent No.: US 12,533,540 B2
(45) Date of Patent: Jan. 27, 2026

(54) ENERGY STORAGE APPARATUS AND FIRE EXTINGUISHING METHOD THEREOF

(71) Applicant: TCC ENERGY STORAGE TECHNOLOGY CORPORATION, Taipei (TW)

(72) Inventor: An-Ping Chang, Taipei (TW)

(73) Assignee: TCC ENERGY STORAGE TECHNOLOGY CORPORATION, Taipei (TW)

( * ) Notice: Subject to any disclaimer, the term of this patent is extended or adjusted under 35 U.S.C. 154(b) by 259 days.

(21) Appl. No.: 18/446,496

(22) Filed: Aug. 9, 2023

(65) Prior Publication Data

US 2024/0050789 A1    Feb. 15, 2024

(30) Foreign Application Priority Data

Aug. 10, 2022    (TW) .................................. 111130061

(51) Int. Cl.
*A62C 3/16* (2006.01)
*A62C 37/40* (2006.01)
(Continued)

(52) U.S. Cl.
CPC ................ *A62C 3/16* (2013.01); *A62C 37/40* (2013.01); *H01M 10/4257* (2013.01);
(Continued)

(58) Field of Classification Search
CPC ........... A62C 3/002; A62C 3/16; A62C 37/40; A62C 35/11; A62C 35/13; H01M 50/251;
(Continued)

(56) References Cited

U.S. PATENT DOCUMENTS

| 9,903,491 B2 | 2/2018 | Karppa et al. |
| 2014/0333004 A1* | 11/2014 | Ciuperca ................... B28B 7/34 |
| | | 249/111 |
| 2021/0249639 A1* | 8/2021 | Shao ................... H01M 10/486 |

FOREIGN PATENT DOCUMENTS

| CN | 109275298 A | * | 1/2019 | ............. A62C 37/40 |
| CN | 110571879 A | | 12/2019 | |

(Continued)

OTHER PUBLICATIONS

European Search Report of corresponding European Patent Application No. 24190539.7 mailed on Nov. 11, 2024.

(Continued)

*Primary Examiner* — Steven M Sutherland
(74) *Attorney, Agent, or Firm* — Idea Intellectual Limited; Sam T. Yip

(57) ABSTRACT

The present disclosure provides an energy storage apparatus and a fire extinguishing method of the energy storage apparatus. The energy storage apparatus includes an energy storage cabinet and a fire extinguishing system. The energy storage cabinet includes a cabinet body. The cabinet body is configured to withstand flames at a temperature equal to or greater than about 150° C. and has a compressive strength greater than about 60 MPa. The cabinet body has an accommodating space for accommodating at least one battery system. The fire extinguishing system includes a liquid injection device which is configured to inject liquid into the accommodating space of the cabinet body to flood the at least one battery system for fire extinguishing.

21 Claims, 6 Drawing Sheets

(51) Int. Cl.
  *H01M 10/42*   (2006.01)
  *H01M 50/204*  (2021.01)
  *H01M 50/222*  (2021.01)
  *H01M 50/233*  (2021.01)
  *H01M 50/251*  (2021.01)
  *H01M 50/342*  (2021.01)
  *H01M 50/383*  (2021.01)

(52) U.S. Cl.
  CPC ....... *H01M 50/204* (2021.01); *H01M 50/222* (2021.01); *H01M 50/233* (2021.01); *H01M 50/251* (2021.01); *H01M 50/3425* (2021.01); *H01M 50/383* (2021.01); *H01M 2010/4271* (2013.01); *H01M 2200/10* (2013.01); *H01M 2220/10* (2013.01)

(58) Field of Classification Search
  CPC ........... H01M 50/3425; H01M 50/222; H01M 50/204; H01M 50/383; H01M 50/233; H01M 10/4257; H01M 2010/4271; H01M 2200/10; H01M 2220/10
  See application file for complete search history.

(56) References Cited

FOREIGN PATENT DOCUMENTS

| | | | | |
|---|---|---|---|---|
| CN | 111463506 A | * | 7/2020 | ............ H01M 50/24 |
| CN | 112002846 A | * | 11/2020 | .............. B60L 50/64 |
| CN | 114024060 A1 | | 2/2022 | |
| CN | 114156568 A | | 3/2022 | |
| CN | 114497802 A | | 5/2022 | |
| CN | 216603874 U | | 5/2022 | |
| DE | 102017210615 A1 | | 12/2018 | |
| DE | 202021106777 U1 | | 1/2022 | |
| JP | 2016073328 A | | 5/2016 | |
| JP | 6263663 B1 | | 1/2018 | |
| JP | 2021-515379 A | | 6/2021 | |
| TW | M625834 U | | 4/2022 | |
| WO | WO-2023001398 A1 | * | 1/2023 | .......... H01M 10/488 |

OTHER PUBLICATIONS

Office Action of corresponding Taiwan patent application No. 112112517 mailed on Aug. 28, 2023.

* cited by examiner

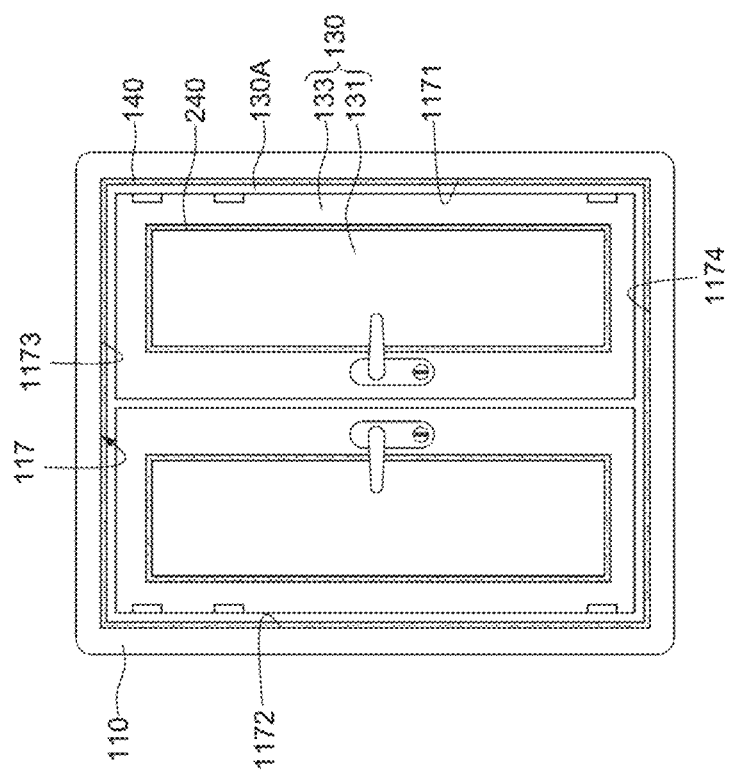
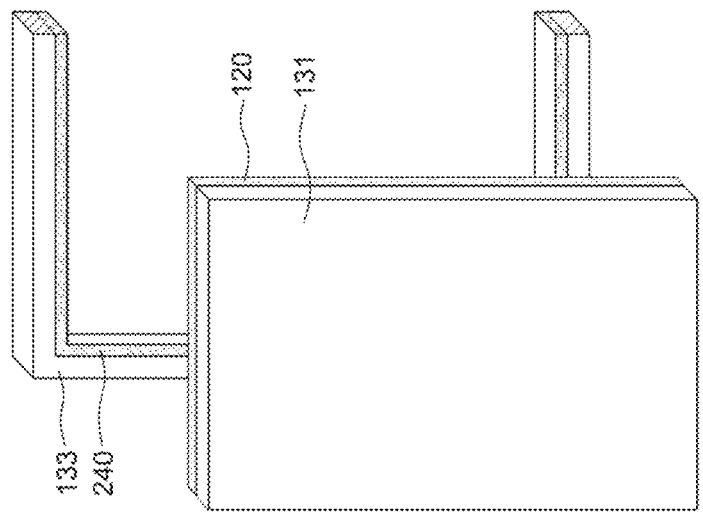
FIG. 3A
FIG. 3B

ENERGY STORAGE APPARATUS AND FIRE EXTINGUISHING METHOD THEREOF

BACKGROUND

1. Technical Field

The present disclosure substantially relates to an energy storage apparatus and a fire extinguishing method thereof, and more particularly, the present disclosure relates to an energy storage apparatus including a fire extinguishing system and a fire extinguishing method thereof.

2. Description of the Related Art

In order to improve the efficiency and flexibility of energy use, energy storage development has become a trend in recent years. With the developments in battery technology (such as lithium batteries), battery energy storage apparatuses have become one of the mainstream energy storage apparatuses.

However, in the process of battery storage and transportation, various factors (such as overcharging, impact, electrical control system errors, and defects in the operating environment or process) can damage separators in the batteries, such that the positive electrode and the negative electrode can contact and generate a short circuit, resulting in a high-temperature chemical reaction that can ignite the combustible organic components in the batteries. The high temperature resulted from the thermal runaway of batteries may further damage the apparatus adjacent to the battery energy storage apparatuses and increase occurrence of fire accidents.

SUMMARY OF THE INVENTION

In one or more embodiments, an energy storage apparatus includes an energy storage cabinet and a fire extinguishing system. The energy storage cabinet includes a cabinet body. The cabinet body is configured to withstand flames at a temperature equal to or greater than about 150° C. and have a compressive strength greater than about 60 MPa. The cabinet body includes an accommodating space for accommodating at least one battery system. The fire extinguishing system includes a liquid injection device. The liquid injection device is configured to inject liquid into the accommodating space of the cabinet body to flood the at least one battery system for fire extinguishing.

In one or more embodiments, a fire extinguishing method of an energy storage apparatus includes: providing an energy storage apparatus, including: an energy storage cabinet and a fire extinguishing system, the energy storage cabinet including a cabinet body, the cabinet body being configured to withstand flames at a temperature equal to or greater than about 150° C. and have a compressive strength greater than about 60 MPa, and the cabinet body including an accommodating space for accommodating at least one battery system, and the fire extinguishing system including a liquid injection device and a fire sensor, the liquid injection device being configured to inject liquid to the accommodating space of the cabinet body to flood the at least one battery system for fire extinguishing; and performing a flooding step, including: in response to a first fire signal generated by the fire sensor, injecting liquid into the accommodating space of the cabinet body by the liquid injection device to flood the at least one battery system for fire extinguishing.

In one or more embodiments, an energy storage apparatus includes an energy storage cabinet and a fire extinguishing system. The energy storage cabinet includes a cabinet body. The cabinet body includes an accommodating space for accommodating at least one battery system. The cabinet body further includes a pressure relief valve. The pressure relief valve is configured to be opened when a pressure in the accommodating space is greater than a threshold. The fire extinguishing system includes a liquid injection device. The liquid injection device is configured to inject liquid into the accommodating space of the cabinet body to flood the at least one battery system for fire extinguishing.

BRIEF DESCRIPTION OF THE DRAWINGS

When the present disclosure is read with reference to the accompanying drawings, aspects of the present disclosure can be better understood according to the following implementations. It should be noted that various features may not be drawn to scale and that the dimensions of the various features may be arbitrarily scaled up or down to clearly depict the content of the present disclosure.

FIG. 3A is a partial schematic diagram of a cabinet body of an energy storage apparatus according to some embodiments of the present disclosure;

FIG. 3B is a partial exploded view of a door of a cabinet body of an energy storage apparatus according to some embodiments of the present disclosure;

In the drawings and implementations of the present disclosure, the same or similar components are denoted by the same reference numerals.

DETAILED DESCRIPTION

Figure 1A:
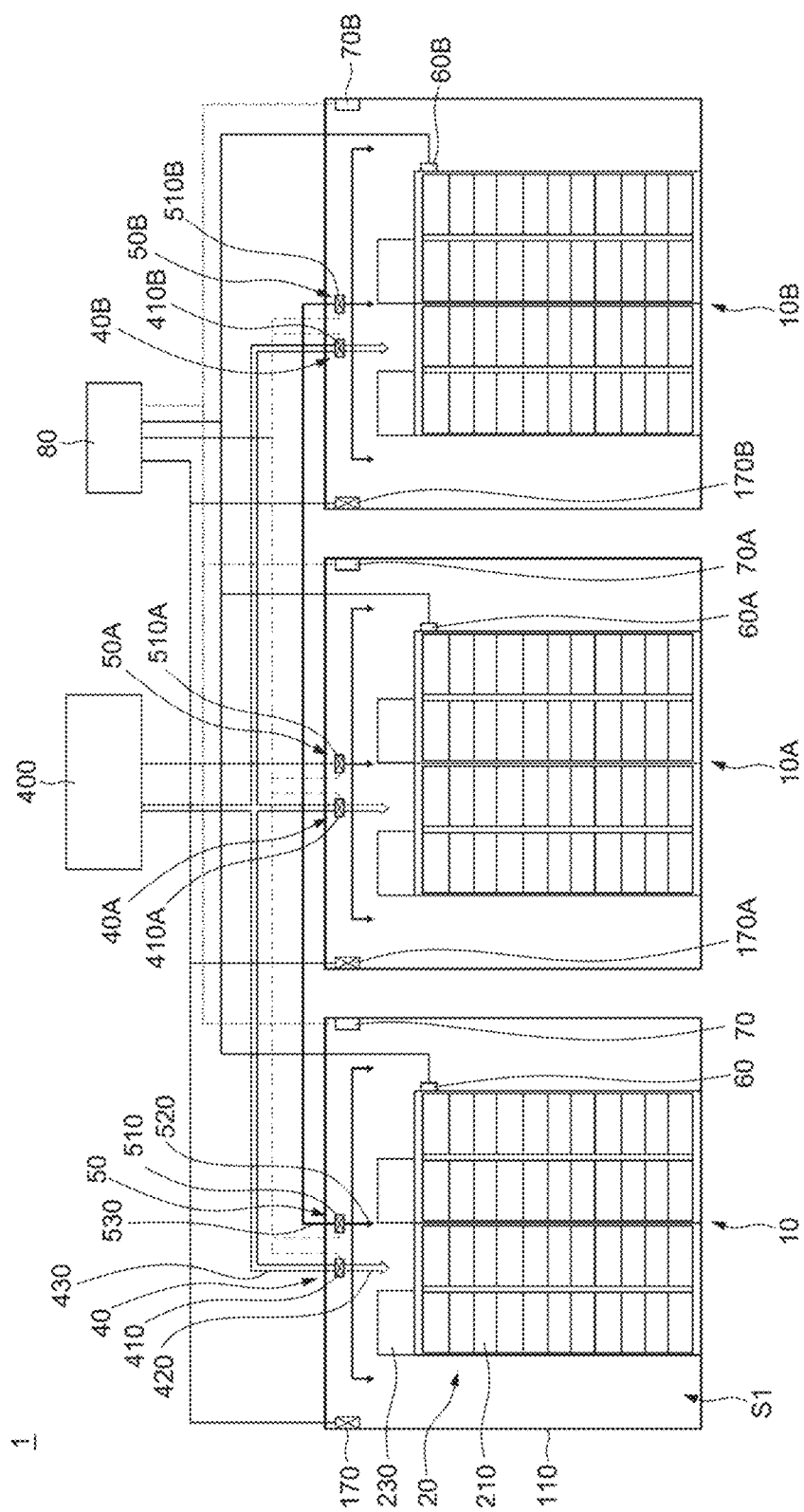
FIG. 1A is a schematic diagram of an energy storage apparatus according to some embodiments of the present disclosure.

FIG. 1A is a schematic diagram of an energy storage apparatus 1 according to some embodiments of the present disclosure.

Referring to FIG. 1A, the energy storage apparatus 1 may include one or more energy storage cabinets (for example, energy storage cabinets 10, 10A, and 10B), one or more battery systems 20, a fire extinguishing system, and a control system 80. It should be noted that the content of the present disclosure is described below by using an example in which the energy storage apparatus includes three energy storage cabinets 10, 10A, and 10B, but a quantity of energy storage cabinets that the energy storage apparatus 1 of the present disclosure can include is not limited thereto and may be adjusted according to an actual application.

In some embodiments, the energy storage cabinets 10, 10A, and 10B may each include a cabinet body 110. Each cabinet body 110 may include an accommodating space S1 for accommodating at least one battery system 20. In some embodiments, the energy storage cabinets 10, 10A, and 10B may respectively further include pressure relief valves 170, 170A, and 170B. In some embodiments, the pressure relief valves 170, 170A, and 170B are each configured to be opened when the pressure in the accommodating space S1 is greater than a threshold. In some embodiments, the threshold is less than the compressive strength of the cabinet body 110. According to some embodiments of the present disclosure, the pressure relief valve may be opened to release the pressure (for example, the pressure generated by gas in the accommodating space S1) in the accommodating space S1 out of the cabinet body 110. In some embodiments, the pressure relief valves 170, 170A, and 170B are located at the top of the cabinet body 110. In some embodiments, the pressure relief valve 170, 170A, and 170B are located above the battery system 20.

In some embodiments, the battery system 20 of each energy storage cabinet may include a plurality of battery packs 210, a battery management system (BMS) 230, and an integrated energy management system (EMS). The battery management system 230 is located above the battery packs 210 and is electrically connected to a plurality of corresponding battery packs 210 that are connected in series. In some embodiments, each battery pack 210 includes a temperature sensor configured to detect a temperature of the battery pack 210. In some embodiments, the battery management system 230 is configured to reduce or cut off, according to a temperature signal of each battery pack 210 received by the battery management system 230, an output current or an input current of the corresponding battery pack 210. In some embodiments, the battery management system 230 is configured to reduce or cut off, when the temperature of each battery pack 210 exceeds a threshold (for example, about 50° C. or 55° C.), an output current or an input current of the corresponding battery pack 210. Reducing or cutting off the output current or the input current of the corresponding battery pack 210 can lower the temperature of the battery pack 210, to further reduce the risk of fire or extinguish fire. In some embodiments, the energy management system (EMS) is configured to transfer energy of one or more batteries in a battery system 20 in a specific energy storage cabinet to a battery system 20 of another energy storage cabinet. Through the design of the integrated energy management system, energy in a battery system 20 in an energy storage cabinet that is at risk of fire or has caught fire may be transferred to a battery system 20 of another energy storage cabinet, so that the risk of fire may be reduced, or the fire may be extinguished. In some embodiments, the pressure relief valves 170, 170A, and 170B are respectively located above corresponding battery packs 210.

In some embodiments, the fire extinguishing system may include a liquid injection device (for example, liquid injection devices 40, 40A, and 40B). In some embodiments, the liquid injection device is configured to inject liquid into an accommodating space S1 of a cabinet body 110 of an energy storage cabinet corresponding to the liquid injection device to flood a battery system 20 in the accommodating space S1 for fire extinguishing. In some embodiments, the liquid injected by the liquid injection device 40 may include an aqueous solution, an electrolyte (for example, sodium sulfate ($Na_2SO_4$), sodium chloride (NaCl), sodium hydroxide (NaOH), or the like), or other liquid that can be used for fire extinguishing, or any combination thereof. In some embodiments, the liquid injection device is configured to be started in response to at least one fire signal. In some embodiments, the liquid injection device is configured to be started in response to at least one fire signal of the energy storage cabinet corresponding to the liquid injection device. In some embodiments, the liquid injection device 40 is configured to be started in response to at least one fire signal of the energy storage cabinet 10. In some embodiments, the liquid injection device 40 is configured to inject liquid into the accommodating space S1 of the cabinet body 110 of the energy storage cabinet 10 to flood the battery system 20 for fire extinguishing. In some embodiments, the liquid injection device 40A is configured to be started in response to at least one fire signal of the energy storage cabinet 10A. In some embodiments, the liquid injection device 40A is configured to inject liquid into accommodating space S1 of the cabinet body 110 of the energy storage cabinet 10A to flood the battery system 20 for fire extinguishing. In some embodiments, the liquid injection device 40B is configured to be started in response to at least one fire signal of the energy storage cabinet 10B. In some embodiments, the liquid injection device 40B is configured to inject liquid into the accommodating space S1 of the cabinet body 110 of the energy storage cabinet 10B to flood the battery system 20 for fire extinguishing. Once the battery system 20 catches fire, since the temperature of the battery is high enough, the battery can continue burning without oxygen until the energy is exhausted, and thus the conventional fire extinguishing method of isolating oxygen cannot effectively extinguish fire of the battery system 20. According to some embodiments of the present disclosure, injecting liquid to flood the battery system 20 can lower the temperature of the battery packs 210 of the battery system 20, to further extinguish fire. Further, the integrated energy management system may further transfer energy of other battery system (s) 20 in the energy storage cabinet in which the battery system 20 that has caught fire is located into a battery system of another energy storage cabinet, which may further accelerate fire extinguishing.

In some embodiments, the liquid injection device 40 is configured to flood the battery system 20 in the energy storage cabinet 10 before the battery system 20 is completely burnt. In some embodiments, the liquid injection device 40 is configured to flood the battery system 20 before the fire spreads. In some embodiments, the liquid injection device 40 is configured to be started in response to at least one fire signal of the energy storage cabinet 10 and flood the battery system 20 in the energy storage cabinet 10 before the fire spreads. In some embodiments, the liquid injection device 40 is configured to flood the battery system 20 within an injection time of less than about 10 minutes (for example, an injection time of about 10 minutes, 9 minutes, 7 minutes, 5 minutes, 3 minutes, 2.5 minutes, or 2 minutes, or another injection time ranging from 2 to 10 minutes).

In some embodiments, the liquid injection device 40 includes a solenoid valve 410, an outlet 420 and a pipeline 430. In some embodiments, liquid provided by a liquid supply system 400 is supplied to the liquid injection device 40 through the pipeline 430. The solenoid valve 410 opens when the liquid injection device 40 receives a fire signal, so that the liquid provided from the liquid supply system 400 is injected into the accommodating space S1 of the cabinet body 110 of the energy storage cabinet 10 through the outlet 420 to flood the battery system 20 for fire extinguishing. In some embodiments, the outlet 420 may be located above the battery packs 210. In some other embodiments, the outlet 420 may be located at the bottom of the cabinet body 110. The outlet 420 of the present disclosure is not limited to being arranged at a specific position provided that the outlet 420 can be used for injecting liquid to flood the battery system 20 for fire extinguishing. In some embodiments, the liquid injection device 40 may include one or more solenoid valves 410, one or more outlets 420, and one or more pipelines 430.

In some embodiments, the liquid injection devices 40, 40A, and 40B respectively include solenoid valves 410, 410A, and 410B, and may be started respectively in response to fire signals of the respective energy storage cabinets 10, 10A, and 10B, to inject, through the corresponding outlets 420, liquid provided by the liquid supply system 400 into the accommodating spaces S1 of the cabinet bodies 110 of the corresponding energy storage cabinets 10, 10A, and 10B, to flood the battery systems 20 for fire extinguishing. In some embodiments, the liquid supply system 400 may include a liquid storage tank, a fire water supply system (for example, a fire water tank), or a combination thereof. In some embodiments, the pipelines 430 of the liquid injection devices 40, 40A, and 40B are all connected to the same liquid supply system 400. In some embodiments, the pipelines 430 of the liquid injection devices 40, 40A, and 40B may be connected to different liquid supply systems. For example, the pipelines 430 of the liquid injection devices 40 and 40A may be connected to a liquid storage tank, and the pipeline 430 of the liquid injection device 40B may be connected to a fire water supply system. In some embodiments, the liquid supply system 400 may include a water storage tank and a fire liquid supply system, and the pipelines 430 of the liquid injection devices 40, 40A, and 40B are all connected to the water storage tank. The water storage tank is further connected to the fire water supply system. The fire water supply system can supply water into the water storage tank continuously, to help the water storage tank to provide water to the liquid injection devices 40, 40A, and 40B continuously.

In some embodiments, the liquid injection device 40 is configured to inject liquid into the accommodating space S1 of the cabinet body at a flow rate greater than or equal to at least about 6 liters/second (L/s). In some embodiments, the liquid injection device 40 is configured to inject liquid into the accommodating space S1 of the cabinet body 110 at a flow rate of 6 L/s or higher, 20 L/s, 35 L/s, 50 L/s, 70 L/s, or 80 L/s, or another flow rate ranging from 6 to 80 L/s. In some embodiments, the height of the cabinet body 110 is less than 3 meters (for example, a height of about 2.9 meters, 2.5 meters, or 2 meters, or another height ranging from 2 to 2.9 meters). In some embodiments, the liquid storage tank is located above the cabinet body 110. The distance between the bottom of the liquid storage tank and the bottom of the accommodating space S1 of the cabinet body 110 is about 3 meters. The diameter of the pipeline 430 is about 3 inches or 4 inches. The flow rate at which the liquid injection device 40 using a pipeline having a 3-inch diameter injects liquid is about 6.38 L/s, and the flow rate can be higher if a larger diameter is used. In some embodiments, if liquid is injected into the accommodating space S1 of the cabinet body 110 at a flow rate of about 6.38 L/s, the battery system 20 can be flooded after an injection time ranging from about 30 to 60 minutes. In some embodiments, the liquid storage tank is located above the cabinet body 110. The distance between the bottom of the liquid storage tank and the bottom of the accommodating space S1 of the cabinet body 110 is about 6 meters. The diameter of the pipeline 430 is about 3 inches or 4 inches. The flow rate at which the liquid injection device 40 injects liquid is about 35.52 L/s, and the flow rate can be higher if a larger diameter is used. In some embodiments, if liquid is injected into the accommodating space S1 of the cabinet body 110 at a flow rate of about 35.52 L/s, the battery system 20 can be flooded after an injection time of about 30 minutes. In some embodiments, the liquid storage tank is located above the cabinet body 110. The distance between the bottom of the liquid storage tank and the bottom of the accommodating space S1 of the cabinet body 110 is about 15 meters. The diameter of the pipeline 430 is about 3 inches or 4 inches. The flow rate at which the liquid injection device 40 injects liquid is about 70.19 L/s, and the flow rate can be higher if a larger diameter is used. In some embodiments, if liquid is injected into the accommodating space S1 of the cabinet body 110 at a flow rate of about 70.19 L/s, the battery system 20 can be flooded within an injection time of about 2.5 minutes. In some embodiments, the flow rate of injecting liquid may also be increased by arranging the liquid storage tank at different heights combined with a booster pump, to flood the battery system 20 after different injection times.

In some embodiments, the fire extinguishing system may further include a spray fire extinguishing device (for example, spray fire extinguishing devices 50, 50A, and 50B). In some embodiments, the spray fire extinguishing device is configured to spray atomized droplets to a battery system 20 of an energy storage cabinet corresponding to the spray fire extinguishing device. In some embodiments, the particle size of the atomized droplets is less than 0.1 cm. In some embodiments, a liquid source of the atomized droplets may include an aqueous solution, an electrolyte (for example, sodium sulfate ($Na_2SO_4$), sodium chloride (NaCl), sodium hydroxide (NaOH), or the like), or other liquid that can be used for fire extinguishing, or any combination thereof. In some embodiments, the spray fire extinguishing device is configured to be started in response to at least one fire signal. In some embodiments, the spray fire extinguishing device 50 is configured to spray atomized droplets to the battery system 20 of the energy storage cabinet 10. In some embodiments, the spray fire extinguishing device 50 is configured to be started in response to at least one fire signal of the energy storage cabinet 10. In some embodiments, the spray fire extinguishing device 50A is configured to spray atomized droplets to the battery system 20 of the energy storage cabinet 10A. In some embodiments, the spray fire extinguishing device 50A is configured to be started in response to at least one fire signal of the energy storage cabinet 10A. In some embodiments, the spray fire extinguishing device 50B is configured to spray atomized droplets to the battery system 20 of the energy storage cabinet 10B. In some embodiments, the spray fire extinguishing device 50B is configured to be started in response to at least one fire signal of the energy storage cabinet 10B. According to some embodiments of the present disclosure, spraying atomized droplets to the battery system 20 can lower the temperature of the battery packs 210 of the battery system 20, to further help to extinguish fire.

In some embodiments, the spray fire extinguishing device 50 includes a solenoid valve 510, an outlet 520, and a pipeline 530. In some embodiments, liquid provided by the liquid supply system 400 is supplied to the spray fire extinguishing device 50 through the pipeline 530. The solenoid valve 510 opens when the spray fire extinguishing device 50 receives a fire signal, so that the liquid provided from the liquid supply system 400 is sprayed as atomized droplets to the battery system 20 of the energy storage cabinet 10 through the outlet 520. In some embodiments, the outlet 520 may be located above the battery packs 210. In some embodiments, the pore size of the outlet 520 of the spray fire extinguishing device is less than the pore size of the outlet 420 of the liquid injection device. In some embodiments, the diameter of the pipeline 530 of the spray fire extinguishing device is less than the diameter of the pipeline 430 of the liquid injection device. In some embodiments, the spray fire extinguishing device 50 may include one or more solenoid valves 510, one or more outlets 520, and one or more pipelines 530.

In some embodiments, the spray fire extinguishing devices 50, 50A, and 50B respectively include solenoid valves 510, 510A, and 510B, and may be started respectively in response to fire signals of the respective energy storage cabinets 10, 10A, and 10B, to spray, through the corresponding outlets 520, liquid provided by the liquid supply system 400 as atomized droplets to the battery systems 20 of the corresponding energy storage cabinets 10, 10A, and 10B. In some embodiments, the pipelines 530 of the spray fire extinguishing devices 50, 50A, and 50B are all connected to the same liquid supply system 400. In some embodiments, the pipelines 530 of the spray fire extinguishing devices 50, 50A, and 50B may be connected to different liquid supply systems. For example, the pipelines 530 of the spray fire extinguishing devices 50 and 50A may be connected to a liquid storage tank, and the pipeline 530 of the spray fire extinguishing device 50B may be connected to a fire water supply system. In some embodiments, the liquid supply system 400 may include a water storage tank and a fire water supply system, and the pipelines 530 of the spray fire extinguishing devices 50, 50A, and 50B are all connected to the water storage tank. The water storage tank is further connected to the fire water supply system. The fire water supply system can supply water into the water storage tank continuously, to help the water storage tank to provide water to the spray fire extinguishing devices 50, 50A, and 50B continuously.

In some embodiments, the fire extinguishing system may further include a gas fire extinguishing device (not shown in the figure). In some embodiments, the gas fire extinguishing device is configured to inject fire extinguishing gas into the battery system 20. In some embodiments, the gas fire extinguishing device may be arranged inside the battery system 20. The gas fire extinguishing device may include a plurality of airtight containers filled with concentrated fire extinguishing gas or solidified fire extinguishing gas. An opening of each airtight container is sealed through colloid. The airtight containers are respectively arranged in the respective battery packs 210. When the temperature of the battery pack 210 rises to a predetermined temperature (for example, above about 80° C.), the colloid on the airtight container in the battery pack 210 melts to expose the opening, and the fire extinguishing gas is released from the airtight container through the opening and injected into the battery pack 210 for fire extinguishing. In some other embodiments, the gas fire extinguishing device may include one or more gas delivery pipelines and one or more gas outlet control valves. Gas outlet control valves are arranged in correspondence with the battery packs 210 of the battery system 20. The gas outlet control valve is configured to open in response to at least one fire signal of a battery pack 210 corresponding to the gas outlet control valve. A fire extinguishing gas supply system can provide fire extinguishing gas through a gas supply pipeline to a corresponding gas outlet control valve, to inject the fire extinguishing gas into the battery pack 210 for fire extinguishing. According to some embodiments of the present disclosure, injecting fire extinguishing gas into the battery pack 210 can directly extinguish fire at the region where fire starts, which helps to extinguish fire at the initial stage of battery fire.

In some embodiments, the fire extinguishing system may further include a fire sensor (for example, fire sensors 60, 60A, and 60B). In some embodiments, the fire sensors 60, 60A, and 60B are configured to detect fire statuses of their respective energy storage cabinets 10, 10A, and 10B and generate at least one fire signal. In some embodiments, the fire sensors 60, 60A, and 60B may each include a smoke sensor, a temperature sensor, a combustible gas sensor, or any combination thereof. In some embodiments, the fire sensors 60, 60A, and 60B may each be arranged in the cabinet body 110 and located outside the battery packs 210 and the battery management system 230. According to some embodiments of the present disclosure, compared with sensors arranged inside the battery packs 210, the fire sensors 60, 60A, and 60B arranged outside the battery packs 210 and the battery management system 230 can operate independently and quickly detect smoke, gas, and/or a temperature status in the accommodating space S1. In addition, the fire sensors 60, 60A, and 60B arranged outside the battery packs 210 and the battery management system 230 can choose, according to requirements of a function of the energy storage cabinet and a scenario matching the function of the energy storage cabinet, a detection function matching the requirements of the energy storage cabinet, and can be replaced and maintained easily. Therefore, they have the advantages of high design flexibility and low rework/maintenance costs.

In some embodiments, the fire extinguishing system may further include a plurality of fire sensors located inside the battery packs 210. The fire sensors are respectively located in the battery packs 210. The fire sensors inside the battery pack 210 may each include a smoke sensor, a temperature sensor, a combustible gas sensor, or any combination thereof. In some embodiments, the gas outlet control valve of the gas fire extinguishing device is configured to open in response to at least one fire signal S100 generated by a fire sensor inside a battery pack 210 corresponding to the gas outlet control valve. The fire signal S100 include that the temperature of the battery pack 210 exceeds a threshold (for example, above about 80° C.). In some other embodiments, the gas outlet control valve of the gas fire extinguishing device is configured to open in response to at least one fire signal S100 (for example, at least one fire signal generated by the fire sensor 60, fire sensor 60A, and/or fire sensor 60B) generated by a fire sensor outside a battery pack 210 corresponding to the gas outlet control valve.

In some embodiments, the fire sensor 60 is configured to detect a fire status of the energy storage cabinet 10 to generate a fire signal S101, and the spray fire extinguishing device 50 is configured to spray atomized droplets to the battery system 20 of the energy storage cabinet 10 in response to the fire signal S101. In some embodiments, the fire sensor 60 is configured to detect a fire status of the energy storage cabinet 10 to generate a fire signal S102, and the liquid injection device 40 is configured to inject liquid into the accommodating space S1 of the cabinet body 110 of the energy storage cabinet 10 in response to the fire signal S102 to flood the battery system 20 for fire extinguishing. In some embodiments, similar to the fire sensor 60, the fire sensor 60A is configured to detect a fire status of the energy storage cabinet 10A to generate fire signals S101 and S102. The spray fire extinguishing device 50A and the liquid injection device 40A are respectively configured to be started in response to the fire signals S101 and S102. The fire sensor 60B is configured to detect a fire status of the energy storage cabinet 10B to generate fire signals S101 and S102. The spray fire extinguishing device 50B and the liquid injection device 40B are respectively configured to be started in response to the fire signals S101 and S102.

In some embodiments, the fire extinguishing system may further include a liquid level sensor (for example, liquid level sensors 70, 70A, and 70B). In some embodiments, the liquid level sensor is configured to detect a liquid level inside the accommodating space S1. In some embodiments, the liquid injection device 40 is configured to inject, in response to a liquid level signal generated by the liquid level sensor 70, liquid to flood the battery packs 210 of the energy storage cabinet 10 without flooding the battery management system 230. In some embodiments, the liquid injection device 40A is configured to inject, in response to a liquid level signal generated by the liquid level sensor 70A, liquid to flood the battery packs 210 of the energy storage cabinet 10A without flooding the battery management system 230. In some embodiments, the liquid injection device 40B is configured to inject, in response to a liquid level signal generated by the liquid level sensor 70B, liquid to flood the battery packs 210 of the energy storage cabinet 10B without flooding the battery management system 230. In some embodiments, the liquid level sensors 70, 70A, and 70B may each be arranged in the cabinet body 110 and located outside the battery packs 210 and the battery management system 230. In some embodiments, the liquid level sensors 70, 70A and 70B may each include a liquid level gauge (for example, a water level gauge). In some embodiments, the liquid level sensors 70, 70A and 70B may each include a flow meter, and the liquid level can be calculated based on the size of the accommodating space S1 in cooperation with the flow meter. In some embodiments, the liquid level sensors 70, 70A, and 70B may each include an image sensor (for example, a CCD). A distance between the image sensor and a liquid surface is detected by the image sensor arranged in the cabinet body 110, and then, a liquid level is calculated. In some embodiments, the liquid level sensors 70, 70A, and 70B may each include a plurality of liquid level sensor meters. The plurality of liquid level sensor meters are respectively arranged at different liquid level height positions in a cabinet body 110 (for example, arranged on an inner wall of the cabinet body 110 or arranged on the outer sides of battery packs 210 at different heights) to detect real-time liquid levels.

In some embodiments, the control system 80 may be configured to start the gas fire extinguishing device of the energy storage cabinet 10 when receiving a fire signal S100 from the fire sensor 60 or a fire signal S100 in the battery pack 210. In some embodiments, the control system 80 is configured to further start the spray fire extinguishing device 50 of the energy storage cabinet 10 when receiving a fire signal S101 from the fire sensor 60 after starting the gas fire extinguishing device. In some embodiments, the control system 80 is configured to further start the liquid injection device 40 of the energy storage cabinet 10 when receiving a fire signal S102 from the fire sensor 60 after starting the spray fire extinguishing device 50.

In some embodiments, the control system 80 may be configured to start the gas fire extinguishing device of the energy storage cabinet 10A when receiving a fire signal S100 from the fire sensor 60A or a fire signal S100 in the battery pack 210. In some embodiments, the control system 80 is configured to further start the spray fire extinguishing device 50A of the energy storage cabinet 10A when receiving a fire signal S101 from the fire sensor 60A after starting the gas fire extinguishing device. In some embodiments, the control system 80 is configured to further start the liquid injection device 40A of the energy storage cabinet 10A when receiving a fire signal S102 from the fire sensor 60A after starting the spray fire extinguishing device 50A.

In some embodiments, the control system 80 may be configured to start the gas fire extinguishing device of the energy storage cabinet 10B when receiving a fire signal S100 from the fire sensor 60B or a fire signal S100 in the battery pack 210. In some embodiments, the control system 80 is configured to further start the spray fire extinguishing device 50B of the energy storage cabinet 10B when receiving a fire signal S101 from the fire sensor 60B after starting the gas fire extinguishing device. In some embodiments, the control system 80 is configured to further start the liquid injection device 40B of the energy storage cabinet 10B when receiving a fire signal S102 from the fire sensor 60B after starting the spray fire extinguishing device 50B.

Figure 1B:
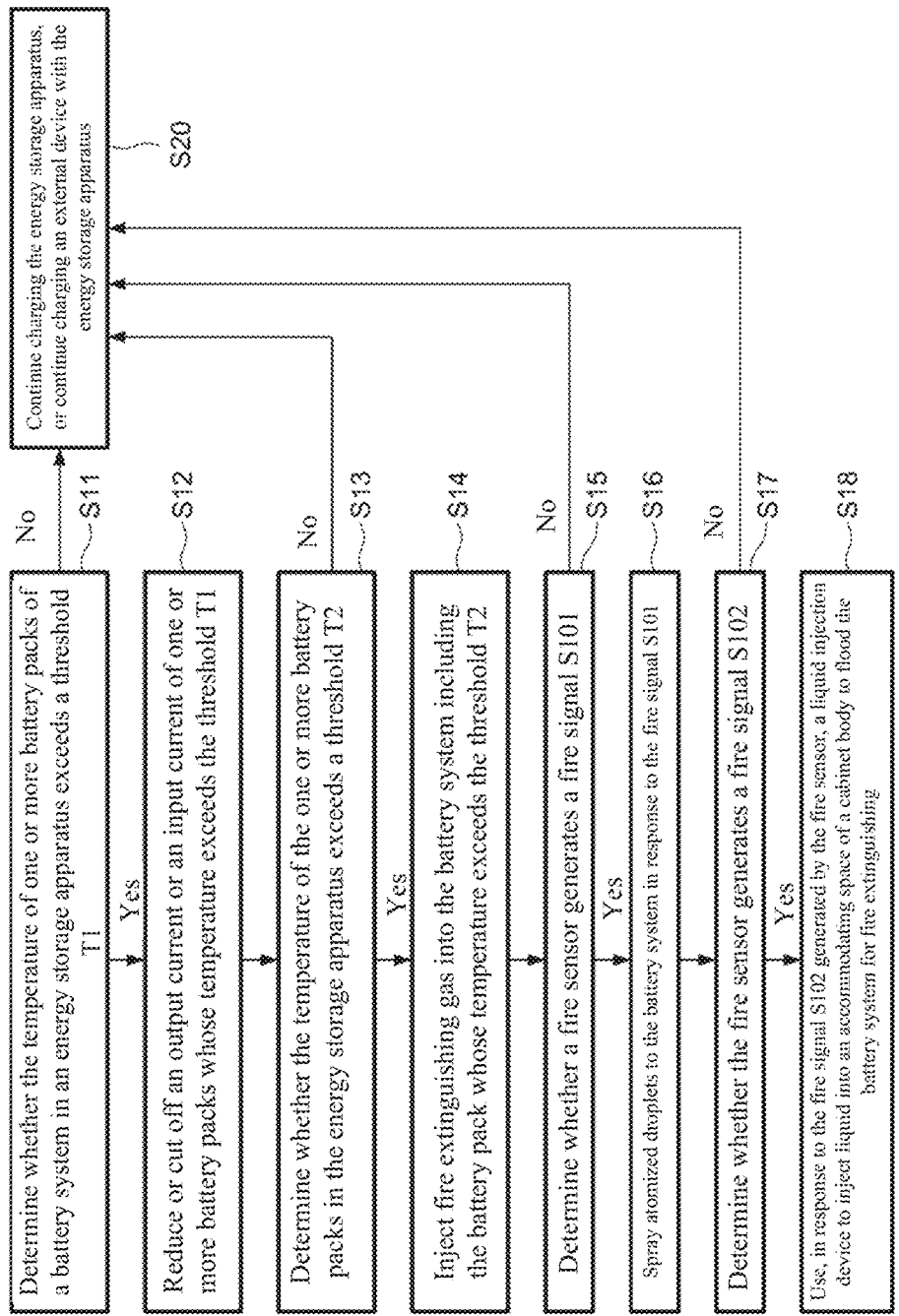
FIG. 1B is a flowchart of a fire extinguishing method of an energy storage apparatus according to some embodiments of the present disclosure.

FIG. 1B is a flowchart of a fire extinguishing method of an energy storage apparatus according to some embodiments of the present disclosure. In some embodiments, the steps shown in FIG. 1B may be performed by, for example, the energy storage apparatus 1 shown in FIG. 1A or another suitable energy storage apparatus.

Step S11: Determine whether the temperature of one or more battery packs 210 of a battery system 20 in an energy storage apparatus exceeds a threshold T1. In some embodiments, in step S11, it is determined whether the temperature of one or more battery packs 210 in energy storage cabinets 10, 10A, and 10B exceeds the threshold T1. In some embodiments, in step S11, the temperature of the battery pack 210 may be detected by a fire sensor (for example, a temperature sensor) inside the battery pack 210. In some embodiments, the threshold T1 may be 50° C., 55° C., 60° C., 65° C., or another temperature ranging from 50° C. to 65° C.

If it is determined that the temperature of one or more battery packs 210 in the energy storage apparatus exceeds the threshold T1, step S12 is performed. Step S12: Reduce or cut off an output current or an input current of one or more battery packs 210 whose temperature exceeds the threshold T1. In some embodiments, a battery management system 230 is configured to reduce or cut off, when the temperature of a battery pack 210 exceeds the threshold T1, an output current or an input current of the battery pack 210.

If it is determined that the temperature of none of the battery packs 210 in the energy storage apparatus exceeds the threshold T1, then it is determined that the energy storage apparatus is not at risk of fire, and step S20 is performed. Step S20 includes continuing charging the energy storage apparatus, or continuing charging an external device with the energy storage apparatus. In some embodiments, the energy storage apparatus may be continuously charged through a power supply device (for example, a power transmission network, a power generation device, or the like), or an external device (for example, an electric motor, an electric locomotive, a charging apparatus for a portable electronic product, or the like) may be continuously charged by the energy storage apparatus.

Step S13: Determine whether a fire sensor generates a fire signal S100. In some embodiments, in step S13, it is determined whether the temperature of the one or more battery packs 210 in the energy storage apparatus exceeds a threshold T2. In some embodiments, the threshold T2 may be 80° C., 90° C., 100° C., 200° C., or another temperature ranging from 80° C. to 200° C. In some embodiments, in step S13, it is determined, through fire sensors (for example, temperature sensors inside the battery packs 210 or outside the battery packs 210), whether the temperature of the one or more battery packs 210 in the energy storage cabinets 10, 10A, and 10B exceeds the threshold T2. In some embodiments, step S13 is performed after step S12. In some embodiments, the threshold T2 is equal to or greater than the threshold T1. In some embodiments, after step S12 is performed, it is determined whether the temperature of the battery packs 210 is reduced to determine whether the energy storage apparatus is still at risk of fire through step S13.

If it is determined that the temperature of any one or more of the battery packs 210 in the energy storage apparatus exceeds the threshold T2, step S14 is performed. Step S14: Perform a gas fire extinguishing step. In some embodiments, the gas fire extinguishing step includes injecting fire extinguishing gas into the battery system 20 including the battery pack 210 whose temperature exceeds the threshold T2. In some embodiments, the gas fire extinguishing step includes injecting, in response to the fire signal S100 generated by the fire sensor, fire extinguishing gas into the battery system 20 of the battery pack 210 corresponding to the generated fire signal S100. If it is determined that the temperature of none of the battery packs 210 in the energy storage apparatus exceeds the threshold T2, or no fire signal S100 is generated, it is determined that the energy storage apparatus is not at risk of fire, then step S20 is performed.

Step S15: Determine whether the fire sensor generates a fire signal S101 in correspondence with one or more energy storage cabinets. In some embodiments, the fire signal S101 includes: in one or more accommodating spaces S1 in the energy storage cabinets 10, 10A, and 10B, whether the smoke concentration exceeds a threshold, whether the temperature exceeds the threshold (for example, about 300° C., 400° C., 500° C., 600° C., or another temperature ranging from 300° C. to 600° C.), whether the concentration of combustible gas exceeds a threshold (for example, 25% of the LFL of the combustible gas, such as the concentration of methane is greater than 0.714% or the concentration of propane is greater than 0.300%), or any combination thereof. In some embodiments, in step S15, it is determined whether the fire sensor 60, fire sensor 60A, and/or fire sensor 60B generates a fire signal S101 in correspondence with the energy storage cabinet 10, energy storage cabinet 10A, and/or energy storage cabinet 10B. In some embodiments, step S15 is performed after step S14. In some embodiments, after step S14 is performed, it is determined whether the fire sensor generates a fire signal S101 after the gas fire extinguishing step is performed to determine whether the energy storage apparatus is still at risk of fire through step S15.

If it is determined that the fire sensor generates a fire signal S101, step S16 is performed. In step S16, a spray fire extinguishing step is performed in response to the fire signal S101 generated by the fire sensor. In some embodiments, the spray fire extinguishing step includes spraying atomized droplets to the battery system 20 of the energy storage cabinet corresponding to the generated fire signal S101. If it is determined that the fire sensor does not generate a fire signal S101, it is determined that the energy storage apparatus is not at risk of fire, then step S20 is performed.

Step S17: Determine whether the fire sensor generates a fire signal S102 in correspondence with one or more energy storage cabinets. In some embodiments, the fire signal S102 includes: in one or more accommodating spaces S1 in the energy storage cabinets 10, 10A, and 10B, whether the smoke concentration exceeds a threshold, whether the temperature exceeds the threshold (for example, about 300° C., 400° C., 500° C., 600° C., or another temperature ranging from 300° C. to 600° C.), whether the concentration of combustible gas exceeds a threshold (for example, 25% of the LFL of the combustible gas, such as the concentration of methane is greater than 0.714% or the concentration of propane is greater than 0.300%), or any combination thereof. In some embodiments, in step S17, it is determined whether the fire sensor 60, fire sensor 60A, and/or fire sensor 60B generates a fire signal S102 in correspondence with the energy storage cabinet 10, energy storage cabinet 10A, and/or energy storage cabinet 10B. In some embodiments, step S17 is performed after step S16. In some embodiments, after step S16 is performed, it is determined whether the fire sensor generates a fire signal S102 after atomized droplets are sprayed for fire extinguishing, to determine whether the energy storage apparatus is still at risk of fire through step S17.

If it is determined that the fire sensor generates a fire signal S102, step S18 is performed. In step S18, a flooding step is performed in response to the fire signal S102 generated by the fire sensor. In some embodiments, the flooding step includes using a liquid injection device to inject liquid into the accommodating space S1 of the cabinet body 110 to flood the battery system 20 for fire extinguishing.

According to some embodiments of the present disclosure, the fire extinguishing method includes a plurality of level-by-level progressive steps, which may be stopped at any stage when cooling and fire extinguishing effects are achieved, and therefore, the method has the effects of highly efficient fire extinguishing and reducing costs or damages. Furthermore, according to some embodiments of the present disclosure, fire extinguishing is performed step by step through the plurality of level-by-level progressive steps, and each step helps to cool down the battery. Therefore, even if cooling and fire extinguishing are not achieved completely at a specific step, all the performed steps produce a superimposed cooling effect, so that the cooling down and fire extinguishing effects can be achieved in a more efficient way.

In addition, in the fire extinguishing method of pouring water jets onto the energy storage apparatus in an open space with a water supply from a fire water tank, a large amount of water directly flows through the outer periphery of the energy storage apparatus to the ground. As such, the cooling water cannot come into direct contact with the battery packs that generate a large amount of heat, resulting in a limited cooling effect. Compared with the above, according to some embodiments of the present disclosure, the last step of the fire extinguishing method is to flood the battery packs 210 of the battery system 20 in liquid, and the liquid used for flooding is covered by the cabinet body 110. Therefore, the liquid in the accommodating space S1 is provided with an effect similar to the liquid being sealed, and all the liquid in the accommodating space S1 can be efficiently used for cooling down the battery system 20. For example, the vaporization heat required for the liquid (for example, water) to be heated and evaporated can entirely come from the heat generated by the battery system 20. Therefore, good cooling and fire extinguishing effects can be achieved. Moreover, combustible gas or toxic gas produced by the battery in the battery system 20 due to fire is covered by the liquid in the accommodating space S1, so that the toxic gas can be isolated, and the concentration of the combustible gas can be reduced, thereby reducing the possibility of another disaster caused by fire in the battery system. Accordingly, the energy storage apparatus according to some embodiments of the present disclosure itself can successfully perform cooling and fire extinguishing through the foregoing fire extinguishing method, fire can be extinguished without having to wait for firefighters to arrive at the site to extinguish the fire. Therefore, the energy storage apparatus according to some embodiments of the present disclosure has high safety and can be applied to various scenarios requiring high safety, for example, can be used as a charging pile for an electric vehicle and arranged in a building or a home neighboring region.

In addition, according to some embodiments of the present disclosure, the liquid injection device 40 is configured to inject, in response to a liquid level signal generated by the liquid level sensor 70, liquid to flood the battery packs 210 of the energy storage cabinet 10 without flooding the battery management system 230. Therefore, the liquid can be prevented from flooding the battery management system 230 with a higher-voltage terminal and then causing electric touching, electric leakage, or even an electric shock.

Figure 2:
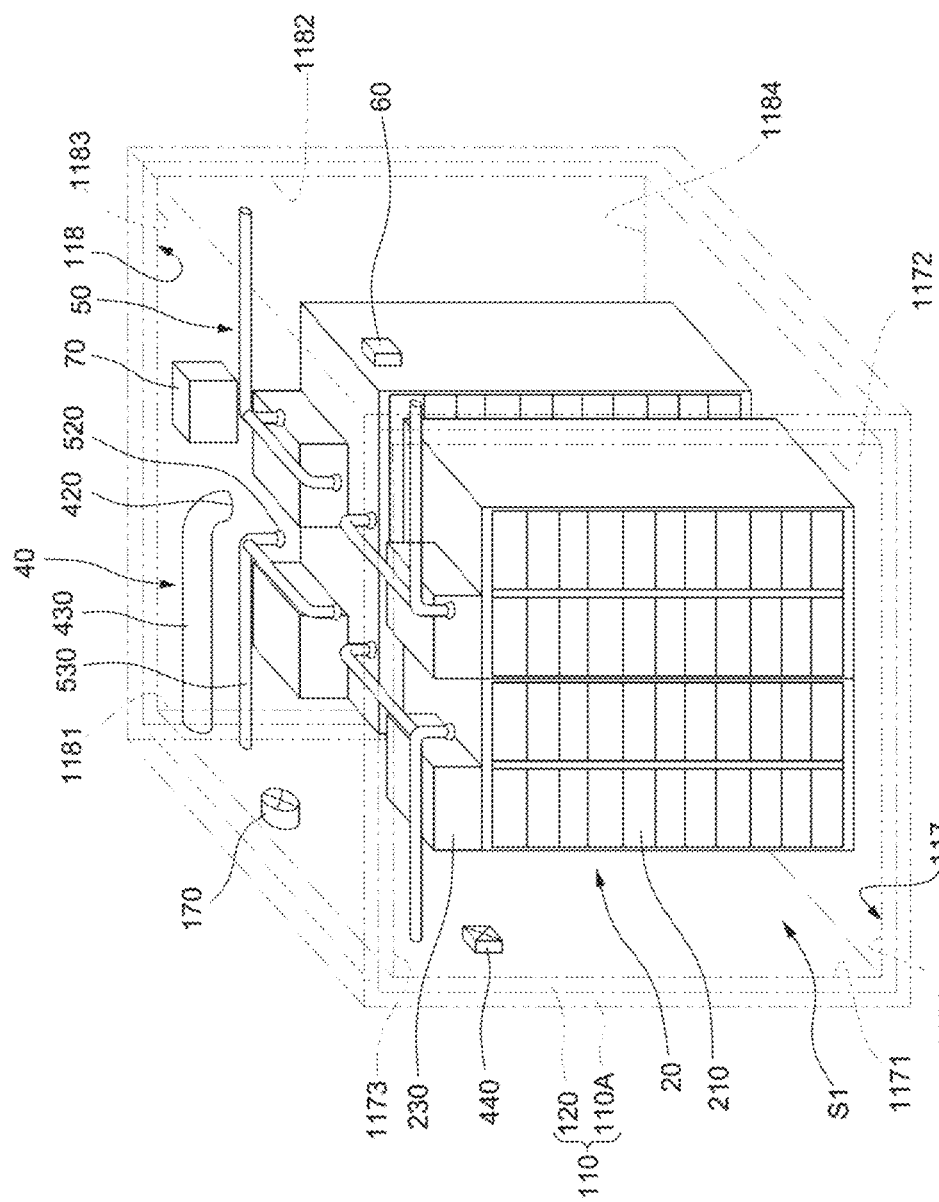
FIG. 2 is a perspective view of an energy storage apparatus according to some embodiments of the present disclosure.

FIG. 2 is a perspective view of an energy storage apparatus according to some embodiments of the present disclosure.

Referring to FIG. 2, the energy storage cabinet 10 may include a cabinet body 110, a battery system 20, a liquid injection device 40, a spray fire extinguishing device 50, a gas fire extinguishing device (not shown in the figure), a fire sensor 60, a liquid level sensor 70, and a pressure relief valve 170. In some embodiments, the battery system 20 may include four battery packs 210 and four corresponding battery management systems 230, but the quantities of battery packs 210 and the battery management systems 230 are not limited thereto. In some embodiments, the cabinet body 110 includes an opening 117 and an opening 118 respectively corresponding to two battery packs 210. A door 130 may be pivotally connected to side edges of the opening 117 and the opening 118 of the cabinet body 110.

In some embodiments, the pressure relief valve 170 is configured to open when the pressure in an accommodating space S1 is greater than a threshold. The threshold is less than the compressive strength of the cabinet body 110. In some embodiments, liquid injected into the accommodating space S1 may evaporate due to the high temperature of the battery system 20, and when the pressure of vapor is too high, the vapor may be discharged through the pressure relief valve 170. In some embodiments, the pressure relief valve 170 may also be configured to open in response to a signal from a fire sensor, to exhaust smoke, combustible gas (for example, methane, propane, or the like), or toxic gas (for example, carbon monoxide).

In some embodiments, the cabinet body 110 may include an outlet control valve 440. In some embodiments, the outlet control valve 440 is configured to open and release the liquid in the accommodating space S1 out of the cabinet body 110. In some embodiments, the outlet control valve 440 is configured to control the flow rate of liquid injection to be greater than the flow rate of liquid discharge, so that the battery system 20 can be continuously in a state of being flooded in the liquid. In some embodiments, the control system 80 is configured to control the flow rate of liquid injection of the liquid injection device 40 and the flow rate of liquid discharge of the outlet control valve 440.

According to some embodiments of the present disclosure, through the design of the outlet control valve 440, the liquid flooding the battery packs 210 can be cooled, before evaporating, again by liquid flowing in. Therefore, the cooling effect of the liquid in the accommodating space S1 for the battery system 20 is improved, and the cooling and fire extinguishing effects of the energy storage apparatus are further improved.

In some embodiments, the cabinet body 110 includes a concrete body 110A and a flame retardant material layer 120. In some embodiments, the concrete body 110A is formed of an ultra-high performance concrete (UHPC), and the flame retardant material layer 120 is in direct contact with one or more inner surfaces of a plurality of walls of the concrete body 110A and is exposed to the accommodating space S1. In some embodiments, the walls of the concrete body 110A have a thickness of less than or equal to about 5 cm. In some embodiments, the walls of the concrete body 110A have a thickness of less than or equal to about 2.5 cm. In some embodiments, the size of the accommodating space S1 allows an operator to enter into the accommodating space S1, to maintain and/or operate functional components or apparatuses arranged in the accommodating space S1.

In some embodiments, the concrete body 110A may include synthetic fibers, steel fibers, a combination thereof, or the like. In some embodiments, the length of the synthetic fibers ranges from about 4 mm to about 20 mm, and the diameter of the synthetic fibers ranges from about 0.1 to 0.2 mm. In some embodiments, the synthetic fibers account for about 20 $kg/m^3$ to about 60 $kg/m^3$ of the concrete body 110A. In some embodiments, the length of the steel fibers ranges about 5 mm to about 15 millimeters, and the diameter of the steel fibers is about 0.2 mm. In some embodiments, the steel fibers account for about 120 $kg/m^3$ to about 200 $kg/m^3$ of the concrete body 110A. The synthetic fibers and/or steel fibers can enhance the flexural strength (or bending strength) of the concrete body 110. Since the concrete body 110A includes the foregoing synthetic fibers and/or steel fibers and is formed of UHPC, there is no need to arrange a reinforcement structure (for example, a reinforcement cage and/or a reinforcement assembly including a plurality of stirrups) in the walls of the concrete body 110A. The concrete body 110A itself can have a bending resistance similar to that of ordinary reinforced concrete, so that the concrete body 110A can have a smaller wall thickness as well. Therefore, the overall weight of the cabinet body 110 can be reduced, which is beneficial to carrying and moving of the cabinet body 110.

In some embodiments, the concrete main body 110 may include from about 400 $kg/m^3$ to about 500 $kg/m^3$ of one type of Type I, II, III, IV, or V Portland cement and from about 400 $kg/m^3$ to about 500 $kg/m^3$ of another type of Type I, II, III, IV, or V Portland cement. In some embodiments, the concrete body 110A may include silica fume at a content of about 120 $kg/m^3$ to about 180 $kg/m^3$. In some embodiments, the concrete body 110A may include silica sand at a content of about 900 $kg/m^3$ to about 1000 $kg/m^3$. In some embodiments, the concrete body 110A may include quartz powder at a content of about 30 $kg/m^3$ to about 150 $kg/m^3$. In some embodiments, due to the foregoing combination of silica fume and quartz powder, the concrete body 110A has higher compressive strength than that of ordinary concrete.

In some embodiments, the unit structure weight of the concrete body 110A is equal to or greater than about 2300 $kg/m^3$. In some embodiments, the unit structure weight of the concrete body 110A ranges from about 2300 $kg/m^3$ to about 2700 $kg/m^3$. In some embodiments, the compressive strength of the concrete body 110A is equal to or greater than about 120 MPa. In some embodiments, the compressive strength of the concrete body 110A ranges from about 120 MPa to about 180 MPa. In some embodiments, the ultimate flexural strength of the concrete body 110A is greater than about 15 MPa. Accordingly, no reinforcement cage and/or reinforcement assembly including a plurality of stirrups for improving flexural strength needs to be arranged in the concrete body 110A, so that the concrete body 110A can have a smaller wall thickness, thereby reducing the overall weight of the cabinet body 110. Moreover, the concrete body 110A can provide high compressive strength and high flexural strength for the cabinet body 110, and therefore, can be applied in a more extreme environment (for example, an environment of withstanding high-temperature flames) while still maintaining the integrity of the overall structure.

In some embodiments, the thermal conductivity of the concrete body 110A is equal to or less than about 1.8 W/m·K. In some embodiments, the thermal conductivity of the concrete body 110A ranges from about 1.6 W/m·K to about 1.8 W/m·K. Compared with metal materials or common concrete (whose thermal conductivity is about 1.9 W/m·K to about 2.1 W/m·K), the concrete body 110A of the present disclosure has a better thermal insulation effect, which is conducive to slowing down the heat conduction between the interior of the accommodating space S1 and the outside of the concrete body 110A. When devices or components in the accommodating space S1 need to be maintained at a specific high or low temperature, the good thermal insulation effect of the concrete body 110A helps to reduce the energy required by an air conditioning apparatus, which can reduce costs and has the additional effects of environmental protection, energy saving, and carbon reduction.

In some embodiments, the flame retardant material layer 120 includes ceramic fiber boards, ceramic fiber blankets, refractory mortar, thermal insulation refractory bricks, lightweight aggregate refractory materials, thermal insulation materials, or any combination thereof. In some embodiments, the flame retardant material layer 120 has a thickness of less than or equal to about 5 cm. In some embodiments, the flame retardant material layer 120 has a thickness of less than or equal to about 2.5 cm. In some embodiments, mixed concrete slurry may be poured into a mold with a predetermined shape, the flame retardant material layer 120 may be attached to a semi-finished product of the concrete slurry before the concrete slurry is hardened, and then cured. In this way, the hardened concrete can be firmly combined with the flame retardant material layer 120, so that a bonding interface between the concrete body 110A and the flame retardant material layer 120 has high bonding strength. Therefore, the flame retardant material layer 120 will not fall off due to high heat.

In some embodiments, the cabinet body 110 is configured to withstand flames at a temperature equal to or higher than at least about 150° C. In some embodiments, the cabinet body 110 is configured to withstand flames at a temperature of about 150° C. or higher, 200° C., 300° C., 400° C., 500° C., 600° C., 700° C., 800° C., 900° C., 1000° C., 1100° C., or 1200° C., or another temperature ranging from 150° C. to 1200° C. In some embodiments, the cabinet body 110 is configured to have a compressive strength greater than at least about 60 MPa. In some embodiments, the cabinet body 110 is configured to have a compressive strength of about 60 MPa or higher, 70 MPa, 80 MPa, 90 MPa, 100 MPa, 110 MPa, 120 MPa, 130 MPa, 140 MPa, 150 MPa, 160 MPa, 170 MPa, or 180 MPa, or another compressive strength ranging from 60 MPa to 180 MPa. In some embodiments, the cabinet body 110 is configured to withstand flames at a temperature equal to or higher than about 600° C. and have a compressive strength greater than about 120 MPa. In some embodiments, the cabinet body 110 is configured to withstand flames at a temperature equal to or higher than about 900° C. In some embodiments, the cabinet body 110 is configured to withstand flames at a temperature equal to or higher than a range of about 900° C. to about 1200° C. In some embodiments, the concrete body 110A and the flame retardant material layer 120 are configured as a whole to withstand flames at a temperature equal to or higher than about 900° C. In some embodiments, the concrete body 110A and the flame retardant material layer 120 are configured as a whole to withstand flames at a temperature equal to or higher than a range of about 900° C. to about 1200° C.

In some other embodiments, the cabinet body 110 may also include steel structure materials, such as metal thick boards. In some embodiments, the cabinet body 110 including steel structure materials is configured to withstand flames at a temperature equal to or higher than about 150° C. (for example, a temperature of about 150° C. or higher, 200° C., 300° C., 400° C., 500° C., 600° C., 700° C., 800° C., 900° C., 1000° C., 1100° C., or 1200° C., or another temperature ranging from 150° C. to 1200° C.) and have a compressive strength greater than at least about 60 MPa (for example, a compressive strength of about 60 MPa or higher, 70 MPa, 80 MPa, 90 MPa, 100 MPa, 110 MPa, 120 MPa, 130 MPa, 140 MPa, 150 MPa, 160 MPa, 170 MPa, or 180 MPa, or another compressive strength ranging from 60 MPa to 180 MPa)

FIG. 3A is a partial schematic diagram of a cabinet body 110 of an energy storage apparatus according to some embodiments of the present disclosure.

Referring to FIG. 2 and FIG. 3A, the energy storage cabinet 10 further includes a door 130 and buffer members 140 and 240. In some embodiments, the door 130 may be pivotally connected to a side edge of an opening 117 of the cabinet body 110. In some embodiments, the door 130 may be pivotally connected to side edges 1171 and 1172 of the opening 117 of the cabinet body 110 through a door frame 130A. In some embodiments, the door 130 includes two door plates. The two door plates open in opposite directions and are respectively pivotally connected to the side edges 1171 and 1172 of the opening 117 of the cabinet body 110. In some embodiments, the buffer member 140 is used to seal gaps between the door 130 and the side edges (for example, side edges 1171, 1172, 1173, and 1174) of the opening 117 of the cabinet body 110. In some embodiments, referring to FIG. 2, the energy storage cabinet 10 may further include another door 130. The door 130 may be pivotally connected to side edges 1181 and 1182 of the opening 118 of the cabinet body 110 through the door frame 130A. In some embodiments, the door frame 130A is arranged on the cabinet body 110, and the buffer member 140 is configured to seal gaps between the door 130 and the side edges (for example, side edges 1171, 1172, 1173, and 1174) of the opening 117 of the cabinet body 110. In some embodiments, referring to FIG. 2, the buffer member 140 is configured to seal gaps between the door frame 130A and the side edges (for example, side edges 1181, 1182, 1183, and 1184) of the opening 118 of the cabinet body 110.

In some embodiments, the door 130 includes a concrete layer 131 and a door plate frame 133, and the concrete layer 131 is mounted in the door plate frame 133. In some embodiments, the buffer member 240 is configured to seal gaps between the concrete layer 131 and the door plate frame 133.

In some embodiments, the buffer member 140 is configured to deform or rupture when the pressure in the accommodating space S1 is greater than a threshold, to generate a pressure relief buffer mechanism. In addition, the threshold is less than the compressive strength of the cabinet body 110. In some embodiments, the buffer member 240 is configured to deform or rupture when the pressure in the accommodating space S1 is greater than a threshold, to generate a pressure relief buffer mechanism. In addition, the threshold is less than the compressive strength of the cabinet body 110. In some embodiments, the liquid injection device 40 injects liquid into the accommodating space S1 of the cabinet body 110 at a first flow rate, and the liquid in the accommodating space S1 overflows out of the cabinet body 110 through the pressure relief buffer mechanism at a second flow rate. The first flow rate is greater than the second flow rate. In some embodiments, the buffer members 140 and 240 include silicon carbide.

According to some embodiments of the present disclosure, through the design of the buffer members 140 and 240, part of the liquid can flow out of the cabinet body 110, and the flow rate of liquid injection is maintained greater than the flow rate of liquid discharge. Therefore, the battery system 20 may be continuously in a state of being flooded in the liquid. In addition, no additional pressure sensor or control system is needed to control liquid discharge, which has the effects of simple operation and low costs. Furthermore, through the design of the buffer members 140 and 240, the liquid flooding the battery packs 210 can be cooled, before evaporating, again by liquid flowing in, so that the cooling effect of the liquid in the accommodating space S1 for the battery system 20 is improved, and, the cooling and fire extinguishing effects of the energy storage apparatus are further improved.

FIG. 3B is a partial exploded view of a door 130 of a cabinet body 110 of an energy storage apparatus according to some embodiments of the present disclosure.

In some embodiments, the door 130 includes a concrete layer 131 and a flame retardant material layer 120 arranged on the concrete layer 131. In some embodiments, the concrete layer 131 and the flame retardant material layer 120 constitutes a door plate as a whole. The buffer member 240 is configured to seal gaps between the door plate and a door plate frame 133.

Figure 4:
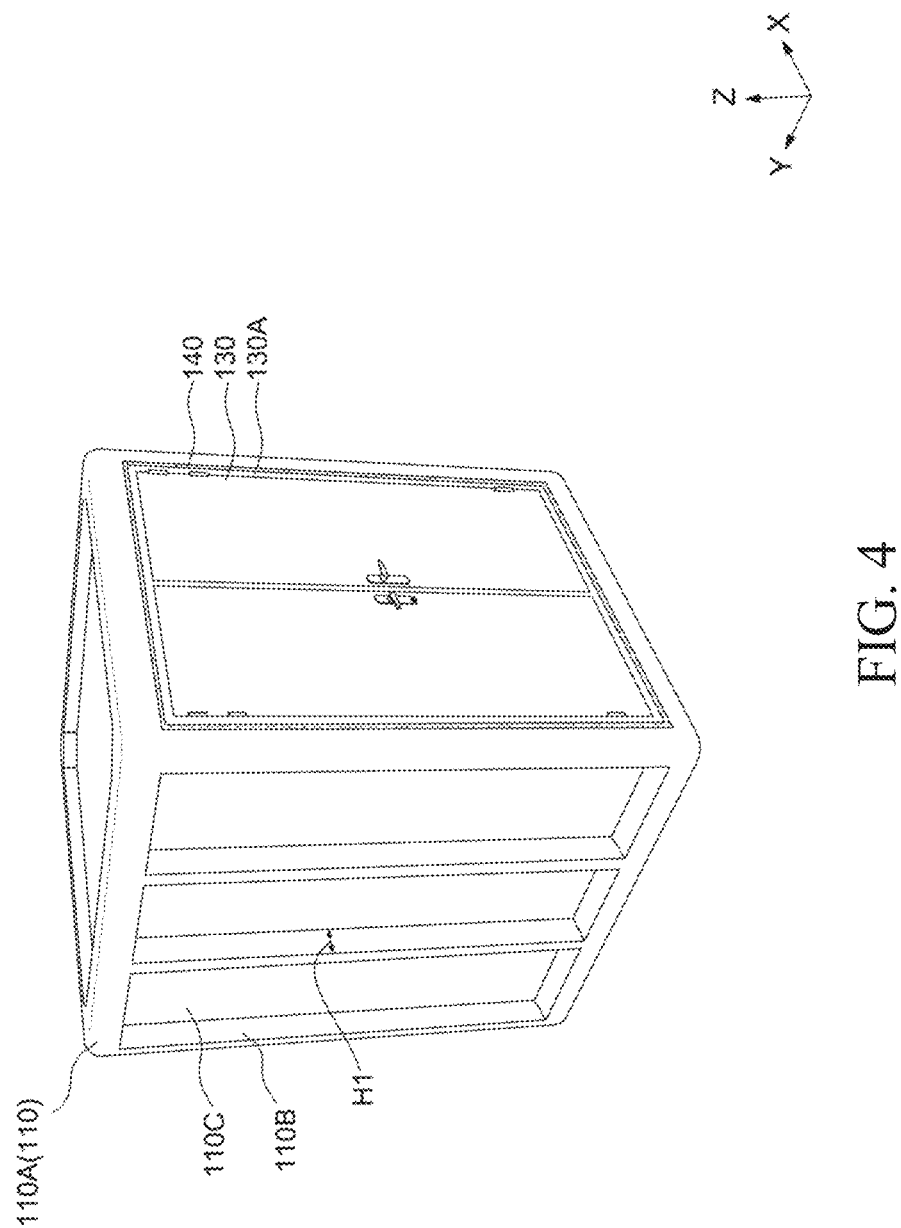
FIG. 4 is a three-dimensional view of a cabinet body of an energy storage apparatus according to some embodiments of the present disclosure.

FIG. 4 is a three-dimensional view of a cabinet body 110 of an energy storage apparatus according to some embodiments of the present disclosure.

In some embodiments, the concrete body 110A of the cabinet body 110 further includes a plurality of ribs 110B. The ribs 110B protrude from a wall 110C of the concrete body 110A. In some embodiments, the protrusion height H1 of the ribs 110B is greater than the thickness of the wall 110C. In some embodiments, the protrusion height H1 of the ribs 110B is about 2 to 5 times the thickness of the wall 110C. In some embodiments, the wall 110C of the concrete body 110A has a thickness less than or equal to about 2.5 cm, and the protrusion height H1 of the ribs 110B ranges from about 10 to 13 cm.

In some embodiments, the concrete body 110A is integrally formed. In some embodiments, the integrally formed concrete body 110A can be produced by pouring mixed concrete slurry into a mold with a predetermined shape, followed by curing and demolding.

Figure 5:
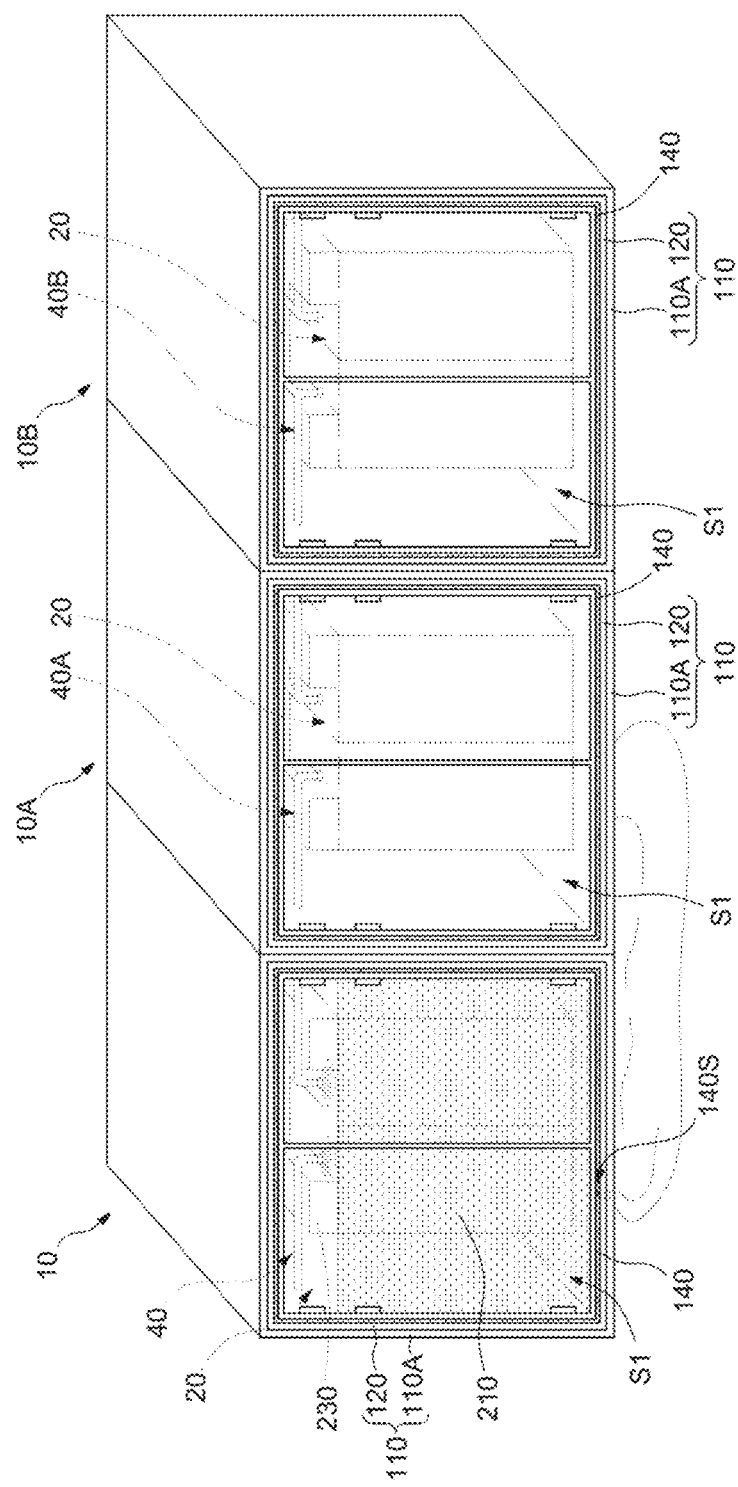
FIG. 5 is a schematic diagram of an energy storage apparatus according to some embodiments of the present disclosure.

FIG. 5 is a schematic diagram of an energy storage apparatus 1 according to some embodiments of the present disclosure.

In some embodiments, the energy storage apparatus 1 includes a plurality of energy storage cabinets 10, 10A, and 10B, and the fire extinguishing system further includes a plurality of liquid injection devices 40, 40A, and 40B. In some embodiments, more than two energy storage cabinets in the plurality of energy storage cabinets can be all arranged close to each other, for example, be arranged close to each other two by two, or a plurality of energy storage cabinets may form a group and be arranged close to each other. The plurality of energy storage cabinets arranged close to each other can form a container-like multi-unit combined energy storage apparatus. In some other embodiments, the plurality of energy storage cabinets 10, 10A, and 10B may be arranged apart from each other. As shown in FIG. 5, in some embodiments, when the energy storage cabinet 10 catches fire, after the flooding step is performed on the energy storage cabinet 10, liquid overflowing from the energy storage cabinet 10 through the pressure relief buffer mechanism 140S of the buffer member 140 can be isolated from the battery system 20 of the energy storage cabinet 10A by the cabinet body 110 of the energy storage cabinet 10A. In addition, in some embodiments, since the cabinet body 110 is configured to withstand flames at a high temperature (for example, flames at a temperature equal to or higher than about 600° C.) and have high compressive strength (for example, compressive strength greater than about 120 MPa), even if a neighboring energy storage cabinet catches fire and generates high heat or liquid that overflows outside due to execution of a flooding step, an energy storage cabinet that does not catch fire (for example, the energy storage cabinets 10A and 10B) can still maintain good operation without being affected.

As used herein, the terms "approximately", "substantially", "basically" and "about" are used to describe and allow for minor variations. When used in conjunction with an event or circumstance, the term can refer to instances in which the event or circumstance precisely occurs as well as instances in which the event or circumstance occurs to a close approximation. For example, when used in connection with a numerical value, the terms may mean a variation range of less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if the difference between two values is less than or equal to ±10% of the mean value of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%, the two values can be considered "substantially" or "approximately" the same. For example, "substantially" parallel may refer to an angular variation range of less than or equal to ±10° relative to 0°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular may refer to an angular variation range of less than or equal to ±10° relative to 90°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces may be considered coplanar or substantially coplanar if the displacement between the two surfaces is not greater than 5 μm, not greater than 2 μm, not greater than 1 μm, or not greater than 0.5 μm.

As used herein, the terms "conductive", "electrically conductive", and "electrical conductivity" refer to the ability to transport an electric current. Conductive materials generally refer to materials that exhibit little or zero resistance to the flow of an electrical current. One measure of the electrical conductivity is Siemens per meter (S/m). Generally, the electrically conductive material is a material with electrical conductivity greater than about $10^4$ S/m (such as at least $10^5$ S/m or at least $10^6$ S/m). The electrical conductivity of a material can sometimes vary with temperature. Unless otherwise specified, the electrical conductivity of a material is measured at room temperature.

As used herein, the singular terms "a/an" and "the" may include a plurality of referents unless the context clearly dictates otherwise. In the descriptions of some embodiments, a component arranged "on" or "above" another component may cover instances in which the former component is directly on (for example, in physical contact with) the latter component, as well as instances in which one or more intervening components are located between the former component and the latter component.

Although the present disclosure has been described and illustrated with reference to specific embodiments of the present disclosure, such description and illustration do not limit the present disclosure. It may be clearly understood by a person skilled in the art that various changes may be made and equivalents may be substituted within embodiments without departing from the true spirit and scope of the present disclosure as defined by the appended claims. The drawings may not necessarily be drawn to scale. Differences may exist between the process reproduction in the present disclosure and the actual apparatus due to variables in the manufacturing process and the like. There may be other embodiments of the present disclosure not specifically shown. The specification and the drawings should be regarded as illustrative rather than limitative. Modifications may be made to adapt a particular circumstance, material, composition of matter, method, or procedure to the object, spirit and scope of the present disclosure. All such modifications are intended to fall within the scope of the appended claims. Although the method disclosed herein has been described with reference to specific operations performed in a specific order, it is understood that such operations may be combined, subdivided, or reordered to form an equivalent method without departing from the teaching of the present disclosure. Therefore, unless specifically indicated herein, the order and grouping of operations are not limitations on the present disclosure.

What is claimed is:

1. An energy storage apparatus, comprising:
    an energy storage cabinet comprising:
        a cabinet body, the cabinet body comprising a concrete body and a flame retardant material layer and configured to withstand flames at a temperature equal to or greater than about 400° C. and have a compressive strength greater than about 60 MPa, and the cabinet body comprising an accommodating space for accommodating at least one battery system, wherein the cabinet body further comprises a pressure relief valve, and the pressure relief valve is configured to be opened when a pressure in the accommodating space is greater than a threshold;
        a door pivotally connected to a side edge of an opening of the cabinet body; and
        a buffer member configured to seal a gap between the door and the side edge of the opening of the cabinet body, wherein the buffer member is configured to deform or rupture when the pressure in the accommodating space is greater than a threshold, to generate a pressure relief buffer mechanism, the threshold being less than the compressive strength of the cabinet body; and
    a fire extinguishing system comprising a liquid injection device, the liquid injection device being configured to inject liquid into the accommodating space of the cabinet body to flood the at least one battery system for fire extinguishing, wherein the liquid injection device injects the liquid into the accommodating space of the cabinet body at a first flow rate, and the liquid inside the accommodating space overflows out of the cabinet body through the pressure relief buffer mechanism at a second flow rate, the first flow rate being greater than the second flow rate.

2. The energy storage apparatus according to claim 1, wherein the fire extinguishing system further comprises a gas fire extinguishing device and a spray fire extinguishing device, the gas fire extinguishing device being configured to inject fire extinguishing gas into the at least one battery system, and the spray fire extinguishing device being configured to spray atomized droplets to the at least one battery system.

3. The energy storage apparatus according to claim 2, wherein the fire extinguishing system further comprises a fire sensor configured to detect a fire status of the energy storage cabinet and generate at least one fire signal, and the energy storage apparatus further comprises a control system, wherein
    the control system is configured to start the gas fire extinguishing device when receiving a first fire signal from the fire sensor;
    after starting the gas fire extinguishing device, the control system is configured to further start the spray fire extinguishing device when receiving a second fire signal from the fire sensor; and
    after starting the spray fire extinguishing device, the control system is configured to start the liquid injection device when receiving a third fire signal from the fire sensor.

4. The energy storage apparatus according to claim 3, wherein the fire sensor comprises a smoke sensor, a temperature sensor, a combustible gas sensor, or any combination thereof.

5. The energy storage apparatus according to claim 1, wherein the liquid injection device is configured to flood the at least one battery system before the fire spreads.

6. The energy storage apparatus according to claim 5, wherein the liquid injection device is configured to flood the at least one battery system within an injection time less than 10 minutes.

7. The energy storage apparatus according to claim 6, wherein the liquid injection device is configured to inject the liquid into the accommodating space of the cabinet body at a flow rate greater than about 6 liters/second.

8. The energy storage apparatus according to claim 1, wherein
    the fire extinguishing system further comprises a liquid level sensor, and the liquid level sensor is configured to detect a liquid level in the accommodating space; and
    the at least one battery system comprises a plurality of battery packs and a battery management system (BMS) located above the plurality of battery packs, and the liquid injection device is configured to inject, in response to a liquid level signal from the liquid level sensor, the liquid to flood the battery packs without flooding the battery management system.

9. The energy storage apparatus according to claim 8, wherein the fire extinguishing system further comprises a fire sensor, the liquid injection device is configured to be started in response to at least one fire signal generated by the fire sensor, and the fire sensor and the liquid level sensor are arranged in the cabinet body and are located outside the battery packs and the battery management system.

10. The energy storage apparatus according to claim 8, wherein the pressure relief valve is located above the plurality of battery packs, and the pressure relief valve is configured to be opened in response to at least one fire signal generated by a fire sensor.

11. The energy storage apparatus according to claim 1, wherein the concrete body is formed of an ultra-high performance concrete (UHPC), and the flame retardant material layer is in direct contact with one or more inner surfaces of a plurality of walls of the concrete body and being exposed to the accommodating space.

12. The energy storage apparatus according to claim 11, wherein the concrete body further comprises a plurality of ribs, the plurality of ribs protruding from the plurality of walls, a protrusion height of the plurality of ribs being greater than a thickness of the plurality of walls.

13. The energy storage apparatus according to claim 1, further comprising a plurality of the energy storage cabinets, wherein the fire extinguishing system further comprises a plurality of the liquid injection devices, each of the liquid injection devices being configured to inject the liquid into the accommodating space of the cabinet body of each of the energy storage cabinets to flood each of the at least one battery system for fire extinguishing.

14. The energy storage apparatus according to claim 13, wherein the energy storage cabinet further comprises an energy management system, the energy management system being configured to transfer energy of one or more batteries of the at least one battery system of one of the energy storage cabinets to the at least one battery system of another one of the energy storage cabinets.

15. The energy storage apparatus according to claim 1, wherein the cabinet body comprises an outlet control valve configured to open and release the liquid in the accommodating space out of the cabinet body at an discharge flow rate, and the outlet control valve is configured to control an injection flow rate of the liquid to be greater than the discharge flow rate.

16. The energy storage apparatus according to claim 1, wherein a size of the accommodating space is configured to allow an operator to enter into the accommodating space.

17. A fire extinguishing method of an energy storage apparatus, comprising:
  providing the energy storage apparatus, comprising:
    an energy storage cabinet comprising:
      a cabinet body, the cabinet body comprising a concrete body and a flame retardant material layer and configured to withstand flames at a temperature equal to or greater than about 400° C. and have a compressive strength greater than about 60 MPa, and the cabinet body comprising an accommodating space for accommodating at least one battery system, wherein the cabinet body further comprises a pressure relief valve;
      a door pivotally connected to a side edge of an opening of the cabinet body; and
      a buffer member configured to seal a gap between the door and the side edge of the opening of the cabinet body; and
    a fire extinguishing system comprising a liquid injection device and a fire sensor, the fire sensor being configured to detect a fire status of the energy storage cabinet and generate at least one fire signal;
  performing a flooding step, comprising: in response to a first fire signal generated by the fire sensor, injecting liquid into the accommodating space of the cabinet body by the liquid injection device to flood the at least one battery system for fire extinguishing;
  opening the pressure relief valve when a pressure in the accommodating space is greater than a threshold;
  causing the buffer member to deform or rupture to generate a pressure relief buffer mechanism when the pressure in the accommodating space is greater than a threshold; and
  causing the liquid in the accommodating space to overflow out of the cabinet body through the pressure relief buffer mechanism, wherein
  the liquid injection device injects the liquid into the accommodating space of the cabinet body at a first flow rate, and the liquid inside the accommodating space overflows out of the cabinet body through the pressure relief buffer mechanism at a second flow rate, the first flow rate being greater than the second flow rate.

18. The fire extinguishing method according to claim 17, further comprising:
  performing a gas fire extinguishing step, comprising: injecting a fire extinguishing gas into the at least one battery system in response to a second fire signal generated by the fire sensor; and
  after performing the gas fire extinguishing step, performing a spray fire extinguishing step in response to a third fire signal generated by the fire sensor, comprising: spraying atomized droplets to the at least one battery system, wherein
  the flooding step is performed after the spray fire extinguishing step.

19. The fire extinguishing method according to claim 17, wherein the at least one battery system comprises a plurality of battery packs and a battery management system located above the plurality of battery packs, the fire extinguishing system further comprises a liquid level sensor, and the flooding step further comprises:
  in response to a liquid level signal generated by the liquid level sensor, injecting the liquid to flood the battery packs without flooding the battery management system.

20. The fire extinguishing method according to claim 19, wherein the pressure relief valve is located above the plurality of battery packs, and the method further comprises:
  opening the pressure relief valve in response to the at least one fire signal generated by the fire sensor.

21. The fire extinguishing method according to claim 17, wherein the energy storage apparatus further comprises a plurality of energy storage cabinets, comprising at least a first energy storage cabinet and a second energy storage cabinet that are arranged adjacently, and the method further comprises:
  performing the flooding step on the first energy storage cabinet, wherein the liquid overflowing from the first energy storage cabinet is isolated from the at least one battery system of the second energy storage cabinet by the cabinet body of the second energy storage cabinet.

* * * * *